(12) United States Patent
van der Pol et al.

(10) Patent No.: US 12,164,302 B2
(45) Date of Patent: Dec. 10, 2024

(54) CONFIGURING A NEURAL NETWORK FOR EQUIVARIANT OR INVARIANT BEHAVIOR

(71) Applicant: Robert Bosch GmbH, Stuttgart (DE)

(72) Inventors: Elise van der Pol, Amsterdam (NL); Frans A. Oliehoek, Delft (NL); Herke van Hoof, Diemen (NL); Max Welling, Bussum (NL); Michael Herman, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 244 days.

(21) Appl. No.: 17/869,438

(22) Filed: Jul. 20, 2022

(65) Prior Publication Data

US 2023/0050283 A1 Feb. 16, 2023

(30) Foreign Application Priority Data

Aug. 10, 2021 (DE) .................... 10 2021 208 722.1

(51) Int. Cl.
  *G05B 19/042* (2006.01)
  *B25J 9/16* (2006.01)
  *E06B 9/24* (2006.01)
  *G05D 1/00* (2006.01)

(52) U.S. Cl.
  CPC ............ *G05D 1/0221* (2013.01); *B25J 9/161* (2013.01); *G05D 1/101* (2013.01)

(58) Field of Classification Search
  CPC ...... G05D 1/0221; G05D 1/101; G05D 1/104; B25J 9/161; G06N 3/006; G06N 3/0985; G06N 7/01
  See application file for complete search history.

(56) References Cited

U.S. PATENT DOCUMENTS

2022/0398460 A1* 12/2022 Dalli .................. G06F 18/2163

FOREIGN PATENT DOCUMENTS

DE 102018204494 B3 8/2019

OTHER PUBLICATIONS

Van Der Pol et al., "MDP Homomorphic Networks: Group Symmetries in Reinforcement Learning," 34th Conference on Neural Information Processing Systems (NEURJPS 2020), Vancouver, Canada, 2020, pp. 1-20.

* cited by examiner

*Primary Examiner* — Brian P Sweeney
(74) *Attorney, Agent, or Firm* — NORTON ROSE FULBRIGHT US LLP; Gerard A. Messina

(57) ABSTRACT

A method for configuring a neural network which is designed to map measured data to one or more output variables. The method includes: transformation(s) of the measured data is/are specified which when applied to the measured data, is/are meant to induce the output variables supplied by the neural network to exhibit an invariant or equivariant behavior; at least one equation is set up which links a condition that the desired invariance or equivariance be given with the architecture of the neural network; by solving the at least one equation a feature is obtained that characterizes the desired architecture and/or a distribution of weights of the neural network in at least one location of this architecture; a neural network is configured in such a way that its architecture and/or its distribution of weights in at least one location of this architecture has/have all of the features ascertained in this way.

11 Claims, 3 Drawing Sheets

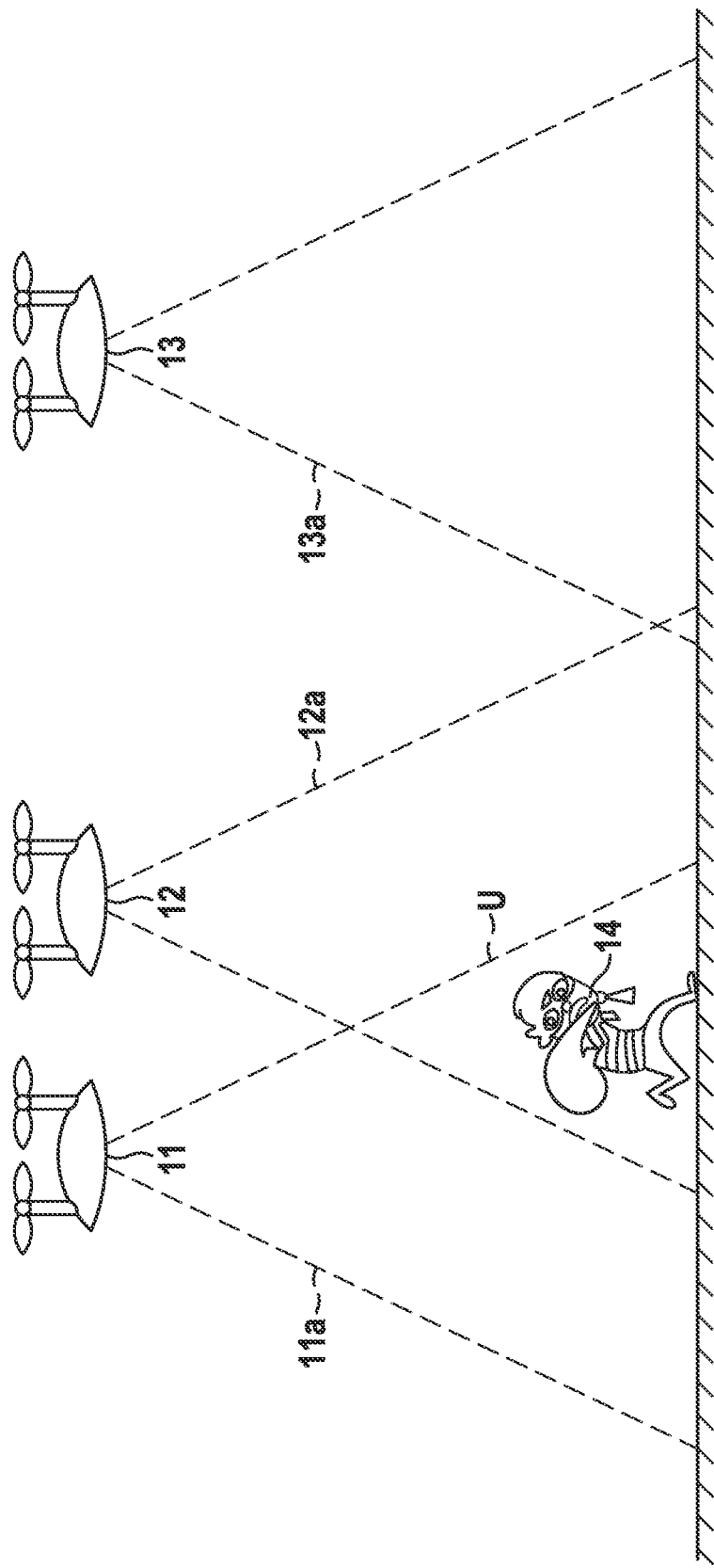

CONFIGURING A NEURAL NETWORK FOR EQUIVARIANT OR INVARIANT BEHAVIOR

CROSS REFERENCE

The present application claims the benefit under 35 U.S.C. 119 of German Patent Application No. DE 10 2021 208 722.1 filed on Aug. 10, 2021, which is expressly incorporated herein by reference in its entirety.

FIELD

The present invention relates to neural networks that can be used for processing sensor data collected onboard a vehicle, for example.

BACKGROUND INFORMATION

When a human driver learns to control a vehicle, he or she has typically been sitting behind the steering wheel during the training for fewer than a hundred hours and has traveled less than 1000 km. It is then expected of this driver to manage even unencountered situations, that is, be able to control the vehicle even in winter when all the driving lessons had taken place in the summer.

In at least semi-automated driving of vehicles, this learning process is mapped by neural networks. Following a training with the aid of measured data from a multitude of situations featuring sufficient variability, the neural network is expected to generalize also to situations not yet encountered.

The greatest cost factor in this context is the driving-based collection of training data during test drives and also the largely manual labeling of these training data with setpoint outputs that the neural network is meant to output when it receives these training data. For that reason, synthetic training data with setpoint outputs known in advance are used as well. German Patent Application No. DE 10 2018 204 494 B3 describes such a method for radar data.

SUMMARY

Within the framework of the present invention, a method for configuring a neural network has been developed. This neural network is designed to map measured data to one or more output variables.

In accordance with an example embodiment of the present invention, in this method, one or more transformation(s) of the measured data is/are specified which when applied to the measured data, are meant to induce the output variables supplied by the neural network to exhibit an invariant or equivariant behavior. 'Equivariant' means that the output variables change in a predictable manner as a function of the transformation.

For example, if the neural network is used to classify objects that are visible in images, then one and the same object should always receive the same classification, regardless of its size in the image or the perspective from which the object is viewed. In other words, the classification should be invariant with regard to scaling of the image or a change in the perspective.

For instance, if the neural network is used to ascertain the position of objects in an image and the input image shifts, then the ascertained position should change in the same way as this shift.

At least one equation is set up, which links a condition that the desired invariance or equivariance be given with the architecture of the neural network. For instance, this may specifically include that the equation links at least one parameter and/or hyperparameter from which the design and/or the basic behavior of the neural network or of a part thereof depend(s) with the condition for the invariance or equivariance.

By solving the at least one equation, at least one feature is obtained which characterizes the desired architecture and/or a distribution of weights of the neural network in at least one location in this architecture. At least one neural network is configured in such a way that its architecture and/or its distribution of weights in at least one location in this architecture has/have all of the features ascertained in this way.

For instance, the distribution of the weights may be indicated in the form of an equation in which the weights occur on both sides. The equation is satisfied for all configurations of weights that belong to the distribution.

It was recognized that the neural network can then be configured from the outset in such a way that its output is equivariant or invariant under predefined desired transformations. Corresponding prior knowledge, e.g., also knowledge about symmetries of the individual application, can thus already be incorporated directly into the architecture of the neural network and consequently need no longer be learned by this network. The invariance or equivariance means that a representation of the measured data that does not change or changes only in a predictable manner during the transformation of the measured data is always produced at least at a certain point in the neural network.

The incorporation of the prior knowledge in this way is much more specific and unambiguous than, for example, presenting the neural network with a large number of views of an object from different perspectives so that the neural network may learn therefrom that all of these views show the same object. At the same time, the time and effort for obtaining corresponding training data are saved. The time and effort for obtaining training data can thus be focused on the core task for whose management the neural network is to be trained.

After the configuration, the neural network can thus be trained in the manner common for the respective task.

In the framework of supervised training using learned measured data and learned output variables, for example, the weights of the neural network are able to be optimized to the effect that the neural network maps the learned measured data to the learned output variables as best as possible.

However, within the framework of reinforced learning in a Markov decision process, the weights of the neural network can also be optimized toward the goal of maximizing the obtained reward if the output variables of the neural network are utilized for the decision of at least one agent of this Markov process.

In one particularly advantageous embodiment of the present invention, the at least one equation includes a function $\phi_u$, which describes a further development of the features of layers of the neural network during the transition from one layer to the next, and/or a function $\phi_m$, which describes an information flow within the neural network as a function of the architecture of the neural network.

The functions $\phi_u$ and $\phi_m$ may particularly be developed as linear layers with a subsequent non-linear activation function, for example. They may be used for modeling two aspects that are particularly insightful for the configuration of the network.

The functions $\phi_u$ and $\phi_m$ are useful especially for modeling a neural network that is developed as a graph, for example, in which nodes occupied by features $h_i^l$ are connected by edges $e_{ij}$. The use of such a network makes it possible to process in particular data that include correlations between their components that can be described by graphs.

For instance, the function $\phi_m$ may then model that messages $m_{j \to i}^l$ in a layer 1 are sent from node j to node i:

$$m_{j \to i}^l = \phi_m(e_{ij}, h_j^l),$$

where $e_{ij}$ denotes the edge between the nodes i and j. As an operand for this edge $e_{ij}$, it is possible, for instance, to use the description of an edge $e_{ij}$ as a differential vector between locations of nodes i and j.

Thus, function $\phi_m$ advantageously links the information flow $m_{j \to i}^l$ from node j to node i in layer I with an edge (length) $e_{ij}$ between nodes i and j and also with features $h_j^l$ of the $j^{th}$ node in layer I.

All messages received by a node i from other nodes j are able to be aggregated using a permutation-invariant aggregation function such as the sum or the maximum:

$$m_i^l = \sum_{j=1}^{|\mathcal{N}_i|} m_{j \to i}.$$

Herein, $\mathcal{N}_i$ denotes the number of neighbors of node i.

The further advancement from one layer to the next, for example, may then be written as:

$$h_i^{l+1} = \phi_u(h_i^l, m_i^l).$$

Thus, function $\phi_u$ advantageously links features $h_i^{l+1}$ of the $i^{th}$ node in the layer l+1 with features $h_i^l$ of the $i^{th}$ node in layer I and also with the information flow $m_i^l$ received in total by this node.

In one particularly advantageous embodiment, at least one group G of transformations g is specified for which the desired invariance or equivariance of the output variables is to apply. The invariance or equivariance then applies to an infinite number of modifications of transformations g that also belong to the group again. For example, it is possible to write equivariance conditions in the form of $$P_g[m_{j \to i}^l] = \phi_m(R_g[e_{ij}], K_g[h_j^l]) \; \forall g \in G,$$

$$L_g[h_i^{l+1}] = \phi_u(K_g[h_i^l], P_g[m_i^l]) \; \forall g \in G,$$

where $K_g$, $P_g$ and $L_g$ describe permutations of group G that act on group channels $h_j^l$, $m_{j \to i}^l$ and/or $h_i^{l+1}$. In practice, $K_g = P_g = L_g$ may often be selected. $R_g$ represents a rotation matrix that acts on edge $e_{ij}$.

In a further advantageous embodiment of the present invention, the at least one equation is expressed in hyperparameters which characterize the architecture of the neural network, and the solving of the at least one equation leads to values of the hyperparameters as features. In this context, the case may occur, for instance, that only whole-numbered values are possible for the hyperparameters (e.g., for a number of nodes or layers in the neural network), but the exact solving of the equation is not a whole number. Rounding to the next whole number then supplies at least a good approximation for the equivariant or invariant behavior. What is then still lacking in the complete equivariance or invariance, the neural network is able to learn from the training data.

In a further advantageous embodiment of the present invention, observations of multiple agents of a centralized or decentralized Markov decision process are selected as measured data. A decentralized Markov decision process, for example, may be defined by:
  a set of N agents $\alpha = \{\alpha_1, \ldots, \alpha_N\}$;
  a common state space $S = \{S_i\}_{i=1, \ldots, N}$;
  a common action space $A = \{A\}_{i=1, \ldots, N}$;
  a transition function $T: S \times A \times S \to [0,1]$, which indicates for an initial state, a performed action and an end state at what probability the performed action leads to the end state, starting from the initial state; and
  a reward function $R: S \times A \to \mathbb{R}$.

The decentralized character of such a process is that each individual agent monitors only a portion of the state, but all agents jointly monitor the complete state. The agents are able to send messages to one another, as previously described for nodes of a graph, while there is no omniscient global instance which coordinates the actions of the individual agents simultaneously.

A reward to be expected when a predefined action is performed in a certain state of the Markov decision process and/or a policy for at least one agent mapping a predefined state to an action to be performed is/are selected as an output variable. This output variable then becomes equivariant or invariant with regard to the predefined one or more transformation(s). In this way, it is possible to specify that these transformations do not modify the decision made on the basis of the output variable or that they modify it only in a predictable manner.

A policy represents the strategy according to which an agent or multiple agents of the Markov decision process is/are acting. For example, a simple policy for a vehicle would be to drive at the legal speed at all times, if possible, while observing mandatory stops due to traffic lights and the right of way of other road users.

The invariant or equivariant behavior is particularly advantageous in the context of Markov decision processes because the reinforced learning is relatively "data-inefficient". That means that the training requires a particularly large set of training data in order to achieve a usable result in comparison with other tasks, e.g., the classification of measured data.

The reinforced learning within a Markov decision process may be carried out using "Q learning", for example, which ascertains the expected value Q of the cumulative reward R for a combination of a state S and an action A. This expected value Q includes the effects of action A in the long term under the current policy. The Q value describes the quality of an action and can therefore be directly used as a strategy in that it is always the action having the greatest Q value that is carried out in a state.

For example, the observations may include positions $x_i$ of agents. This makes it possible to use the Markov decision process for modeling traffic situations, in particular. The positions of other road users thus represent the most important information that every road user has to absorb. Nevertheless, not all road users involved in a traffic situation are able to monitor the positions of all the other road users because the view toward one or more other road user(s) may be obstructed and/or one or more other road user(s) may be at such a great distance that no exact determination of their position is possible. Within the framework of the traffic situation, road users who are incapable of directly monitoring one another are therefore still able to interact with one another, directly or indirectly, at least to the effect that the presence of the one road user has an influence on decisions of the other road user.

In a further, particularly advantageous embodiment of the present invention, a control signal for at least one robot and/or at least one vehicle and/or at least one unmanned flying device is thus ascertained from the reward to be expected and/or from the policy. The robot and/or the vehicle and/or the unmanned flying device is/are controlled by this control signal. This increases the likelihood that the respectively controlled system reacts appropriately to the situation in traffic described by the state in state room S in the context of the present application.

In a further advantageous embodiment of the present invention, a classifier network, which maps the measured data to classification scores with regard to one or more classes of a predefined classification, is selected as a neural network to be configured. As previously described, any prior knowledge as to which transformations of the measured data should not affect the classification scores is then able to be introduced directly into the architecture of the classifier network.

In a further advantageous embodiment of the present invention, a control signal for at least one robot and/or for at least one vehicle and/or for at least one unmanned flying device is ascertained from the classification scores. The robot and/or the vehicle and/or the unmanned flying device is/are controlled by this control signal. This increases the probability that the respectively controlled system reacts appropriately to the situation in traffic described by the measured data and evaluated in the form of the classification scores in the context of the present application.

The present method may particularly be implemented, entirely or partly, by a computer. For this reason, the present invention also relates to a computer program including machine-readable instructions that when executed on one or more computer(s), induce the computer(s) to carry out the described method. In this sense, control devices for vehicles and embedded systems for technical devices that are likewise capable of executing machine-readable instructions should also be considered computer(s).

In the same way, the present invention also relates to a machine-readable data carrier and/or to a download product with the computer program. A download product is a digital product transmittable via a data network or, in other words, a digital product that a user of the data network is able to download and which may be offered for sale, for instance in an online store, for an immediate download.

In addition, a computer may be equipped with the computer program, with the machine-readable data carrier or the download product.

Additional measures that improve the present method will be shown in the following text together with the description of the preferred exemplary embodiments of the present invention with the aid of figures.

BRIEF DESCRIPTION OF THE DRAWINGS

FIG. 2 shows a sketch of a Markov decision process for video monitoring with the aid of drones.

DETAILED DESCRIPTION OF EXAMPLE EMBODIMENTS

Figure 1:
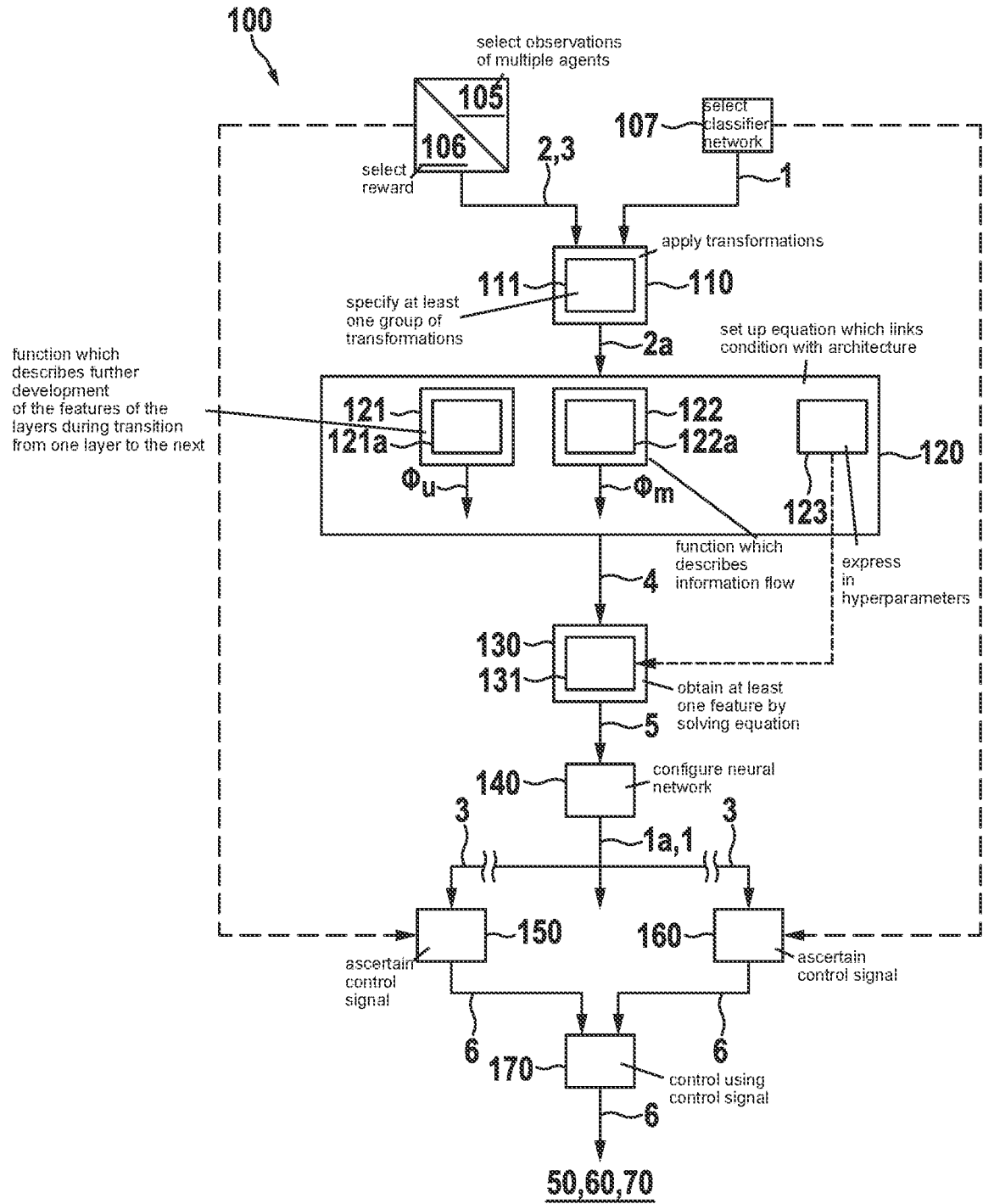
FIG. 1 shows an exemplary embodiment of method 100 for configuring a neural network 1, according to the present invention.

FIG. 1 shows a schematic flow diagram of an exemplary embodiment of method 100 for configuring a neural network 1 which maps measured data 2 to one or more output variable(s) 3.

In step 105, observations of multiple agents of a centralized or decentralized Markov decision process are able to be selected as measured data 2. A reward to be expected when carrying out a predefined action in a certain state of the Markov decision process and/or a policy for at least one agent, which maps a predefined state to an action to be performed, may then be selected as output variable 3 of neural network 1 in step 6.

In step 107, a classifier network which maps measured data 2 to classification scores with regard to one or more classes(s) of a predefined classification can then be selected as neural network 1 to be configured.

In step 110, one or more transformation(s) 2a of measured data 2 is/are specified, which when applied to measured data 2, are to induce output variables 3 supplied by neural network 1 to exhibit an invariant or equivariant response.

According to block 111, at least one group G of transformations 2a to which the desired invariance or equivariance of the output variables 3 is meant to apply may be specified in this context.

In step 120, at least one equation 4 is set up, which links a condition to the effect that the desired invariance or equivariance be given, with architecture 1a of neural network 1.

According to block 121, this at least one equation 4 may particularly include a function $\phi_u$, for example, which describes a further development of the features of layers of neural network 1 during the transition from one layer to the next.

Alternatively or in combination therewith, the at least one equation 4 according to block 122 may particularly include a function $\phi_m$ which describes an information flow within neural network 1 as a function of architecture 1a of neural network 1, for example.

According to block 121a, if the neural network is developed as a graph in which nodes occupied by features $h_i^l$ are linked by edges $e_{ij}$, function $\phi_u$ is able to link in particular features $h_i^{l+1}$ of the $i^{th}$ node in layer l+1 with features $h_i^l$ of the $i^{th}$ node in layer I and also with the information flow $m_i^l$ received in total by this node.

According to block 122a, alternatively or also in combination therewith, the function $\phi_m$ is able to link information flow $m_{j \to i}^l$ from node j to node i in layer I with an edge $e_{ij}$ between nodes i and j and also with features $h_j^l$ of the $j^{th}$ node in layer I.

According to block 123, the at least one equation 4 is able to be expressed in hyperparameters which characterize architecture 1a of neural network 1. For instance, the hyperparameters may include the number, size and types of layers of neural network 1 and/or of neurons or other processing units that make up these layers.

In step 130, at least one feature 5 is obtained by solving the at least one equation 4, which characterizes the desired architecture 1a and/or a distribution of weights of neural network 1 in at least one location in this architecture 1a.

If equation 4 depends on hyperparameters, then the solving of the at least one equation 4 may lead to values of the hyperparameters as features 5 according to block 131.

In step 140, at least one neural network 1 is configured in such a way that its architecture 1a and/or its distribution of weights has/have all of the features 5 ascertained in step 130 in at least one location in this architecture.

In step 150, following intermediate training of the configured neural network 1 and the populating of this network 1 with measured data 2, for example, a control signal 6 for at least one robot 50 and/or for at least one vehicle 60 and/or for at least one unmanned flying vehicle 11-13 is able to be ascertained as output variable 3 from a reward to be expected and/or from a policy within the framework of a Markov decision process.

In step 160, for instance following intermediate training of configured neural network 1 and the populating of this network 1 with measured data 2, it is likewise possible to ascertain a control signal 6 as output variables 3 for at least one robot 50 and/or for at least one vehicle 60 and/or for at least one unmanned flying device 11-13 from classification scores for measured data 2 ascertained by the neural network 1.

Regardless of the source from which control signal 6 is obtained, robot 50 and/or vehicle 60 and/or unmanned flying device 11-13 is/are able to be controlled by this control signal 6 in step 170.

In FIG. 2, a Markov decision process for the video monitoring with the aid of drones in which a neural network 1 configured by the previously described method 100 is able to be utilized is sketched by way of example. In the video monitoring, multiple (i.e., three in this example) drones 11-13 have to coordinate among one another in order to locate an offender 14. Each drone 11-13 has a downward-facing camera and records images of a monitored region 11a-13a. To allow for a reliable detection of offender 14, the offender must be acquired from two different perspectives. The offender must thus be located in the overlap region U of acquisition regions 11a, 12a of at least two drones 11, 12. Each drone 11-13 assisting in this way in a team of at least two drones and catching an offender is given a reward of +1 within the scope of the Markov decision process. No two drones 11-13 may be at the same location on the other side at any time. It is furthermore known that the selected actions of the drones should ideally be equivariant with regard to rotations. If the optimal action of two drones for a given image recording is the enlargement of their distance in the x-direction, then an enlargement of the distance in the y-direction should come about in a rotation of recorded images by 90°. This is an example of a possible specified transformation in step 110 of method 100.

Since the cameras are perpendicularly pointing down, drones 11-13 are unable to see one another. They can transmit merely their respective current observations from respective acquisition range 11a-13a. If the Markov decision process is controlled in a centralized manner, then these observations may conveyed to a central instance which coordinates the deployment of drones 11-13. If the Markov decision process is controlled in a decentralized manner, the observations of a drone 11-13 are able to be transmitted to other drones 11-13 in a limited physical environment.

Figure 3A:
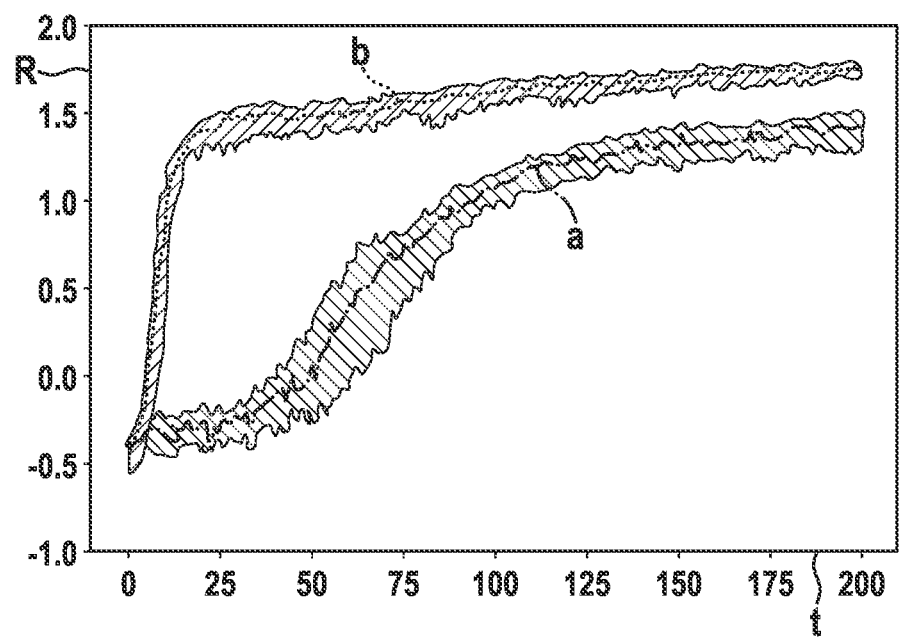
FIGS. 3A and 3B show the effect of method 100 for configuring a neural network 1 in the application shown in FIG. 2, according to the present invention.

FIG. 3A shows medium rewards R over time t, which were obtained within the framework of the Markov decision process sketched in FIG. 2. Curve a was obtained for a conventional neural network 1. Curve b was obtained for a network 1 configured with the aid of the previously described method 100, which right from the start is invariant with regard to certain transformations 2a of the observations (e.g., an adaptation of the brightness or contrast), and equivariant from the start with regard to other transformations 2a (e.g., rotations). It can be seen quite clearly that the performance of network 1 configured with the aid of method 100 increases very rapidly while the conventional neural network 1 must first expend a lot of energy to learn the desired invariances and equivariances.

Figure 3B:
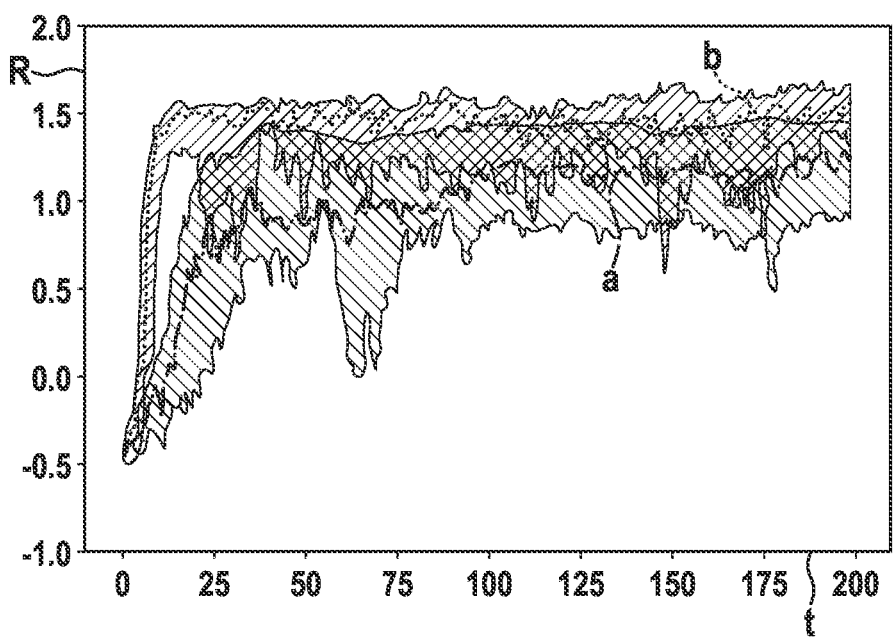

FIG. 3B was prepared analogously to FIG. 3A, with the only difference that the Markov decision process was carried out in a decentralized manner in this instance. In the decentralized case, the performance of conventional neural network 1 is clearly better than in the centralized case, in particular at the start. Nevertheless, neural network 1 configured using method 100 is still much better.

What is claimed is:

1. A method for configuring a neural network which is configured to map measured data to one or more output variables, the method comprising the following steps:
specifying one or more transformations of the measured data which, when applied to the measured data, is meant to induce output variables supplied by the neural network to exhibit a desired invariant or equivariant behavior;
setting up at least one equation which links a condition that the desired invariance or equivariance be given with an architecture of the neural network;
obtaining, by solving the at least one equation, at least one feature that characterizes the architecture and/or a distribution of weights of the neural network in at least one location of the architecture; and
configuring the neural network in such a way that its architecture and/or the distribution of weights in at least one location of the architecture, has all of the ascertained at least one feature;
wherein:
observations of multiple agents of a centralized or decentralized Markov decision process are the measured data,
a reward to be expected when a predefined action is performed in a certain state of the Markov decision process and/or a policy for at least one agent mapping a predefined state to an action to be performed is selected as an output variable of the output variables; and
wherein the method further comprises:
ascertaining, from the reward to be expected and/or from the policy, a control signal for at least one robot and/or for at least one vehicle and/or for at least one unmanned flying device, and
controlling, using the control signal, the robot and/or the vehicle and/or the unmanned flying device.

2. The method as recited in claim 1, wherein the at least one equation includes:
a function $\phi_u$, which describes a further development of features of layers of the neural network during a transition from one layer to the next, and/or
a function $\phi_m$, which describes an information flow within the neural network as a function of the architecture of the neural network.

3. The method as recited in claim 2, wherein the neural network is a graph in which nodes occupied by features $h_i^l$ are connected by edges $e_{ij}$.

4. The method as recited in claim 3, wherein the function du links features $h_i^{l+1}$ of the $i^{th}$ node in a layer l+1 with features $h_i^l$ of the $i^{th}$ node in a layer l and with the information flow $m_i^l$ received in total by the node.

5. The method as recited in claim 4, wherein the function Om links the information flow $m_{j \to i}^l$ from node j to node i in a layer l with an edge $e_{ij}$ between nodes I and j and also with features $h_j^l$ of the $j^{th}$ node in the layer l.

6. The method as recited in claim 1, wherein, in the specifying step, at least one group of transformations is specified for which the desired invariance or equivariance of the output variables is to apply.

7. The method as recited in claim 1, wherein the at least one equation is expressed in hyperparameters which characterize the architecture of the neural network, and the solving of the at least one equation leads to values of the hyperparameters as features.

8. The method as recited in claim 1, wherein the observations include positions of the agents.

9. A method for configuring a neural network which is configured to map measured data to one or more output variables, the method comprising the following steps:
- specifying one or more transformations of the measured data which, when applied to the measured data, is meant to induce output variables supplied by the neural network to exhibit a desired invariant or equivariant behavior;
- setting up at least one equation which links a condition that the desired invariance or equivariance be given with an architecture of the neural network;
- obtaining, by solving the at least one equation, at least one feature that characterizes the architecture and/or a distribution of weights of the neural network in at least one location of the architecture; and
- configuring the neural network in such a way that its architecture and/or the distribution of weights in at least one location of the architecture, has all of the ascertained at least one feature;
- wherein the neural network to be configured is a classifier network, which maps the measured data to classification scores with regard to one or more classes of a predefined classification; and
- wherein the method further comprises:
  - ascertaining, from the classification scores, a control signal for at least one robot and/or for at least one vehicle and/or for at least one unmanned flying device, and
  - controlling, using the control signal, the robot and/or the vehicle and/or the unmanned flying device.

10. A non-transitory machine-readable data carrier on which is stored a computer program for configuring a neural network which is configured to map measured data to one or more output variables, the computer program, when executed by one or more computers, causing the one or more computers to perform the following steps:
- specifying one or more transformations of the measured data which, when applied to the measured data, is meant to induce output variables supplied by the neural network to exhibit a desired invariant or equivariant behavior;
- setting up at least one equation which links a condition that the desired invariance or equivariance be given with an architecture of the neural network;
- obtaining, by solving the at least one equation, at least one feature that characterizes the architecture and/or a distribution of weights of the neural network in at least one location of the architecture; and
- configuring the neural network in such a way that its architecture and/or the distribution of weights in at least one location of the architecture, has all of the ascertained at least one feature;
- wherein the neural network to be configured is a classifier network, which maps the measured data to classification scores with regard to one or more classes of a predefined classification; and
- wherein the computer program, when executed by the one or more computers, further causing the one or more computer to perform the following steps:
  - ascertaining, from the classification scores, a control signal for at least one robot and/or for at least one vehicle and/or for at least one unmanned flying device, and
  - controlling, using the control signal, the robot and/or the vehicle and/or the unmanned flying device.

11. One or more computers configured to configure a neural network which is configured to map measured data to one or more output variables, the one or more computers being configured to:
- specify one or more transformations of the measured data which, when applied to the measured data, is meant to induce output variables supplied by the neural network to exhibit a desired invariant or equivariant behavior;
- set up at least one equation which links a condition that the desired invariance or equivariance be given with an architecture of the neural network;
- obtain, by solving the at least one equation, at least one feature that characterizes the architecture and/or a distribution of weights of the neural network in at least one location of the architecture; and
- configure the neural network in such a way that its architecture and/or the distribution of weights in at least one location of the architecture, has all of the ascertained at least one feature;
- wherein the neural network to be configured is a classifier network, which maps the measured data to classification scores with regard to one or more classes of a predefined classification; and
- wherein the one or more computers are further configured to:
  - ascertain, from the classification scores, a control signal for at least one robot and/or for at least one vehicle and/or for at least one unmanned flying device, and
  - control, using the control signal, the robot and/or the vehicle and/or the unmanned flying device.

* * * * *